Figure 1:
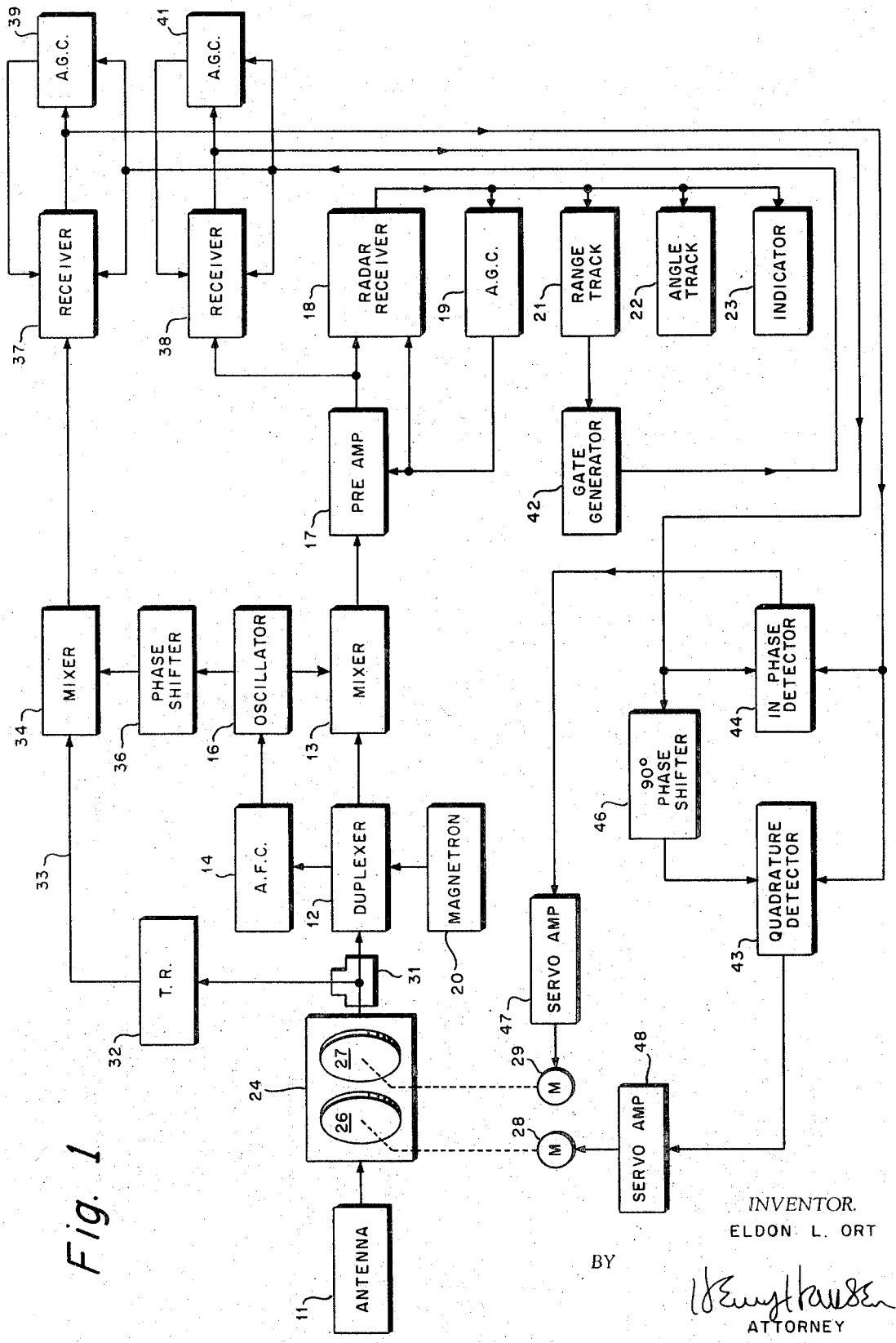

United States Patent [19]
Ort

[11] 3,849,781
[45] Nov. 19, 1974

[54] RADAR SYSTEM
[75] Inventor: Eldon L. Ort, Doylestown, Pa.
[73] Assignee: The United States of America as represented by the Secretary of the Navy, Washington, D.C.
[22] Filed: May 31, 1963
[21] Appl. No.: 285,554

[52] U.S. Cl. .......................... 343/18 E, 343/100 PE
[51] Int. Cl. ............................................. G01s 7/36
[58] Field of Search ....... 343/18 E, 100 PE; 333/17, 333/21 A; 325/367, 370–372, 473–478

[56] References Cited
UNITED STATES PATENTS
3,171,125  2/1905  Butler .................................. 343/18
3,281,837  10/1966  Van Hijfte .................... 343/18 E X
3,733,607  5/1973  Bobrow et al. ................ 343/18 E X Primary Examiner—T. H. Tubbesing
Attorney, Agent, or Firm—Q. Baxter Warner; Henry Hansen

EXEMPLARY CLAIM

1. A radar system capable of effective operation in an ECM environment, comprising in combination:
  antenna means,
  radar receiver means,
  wave guide means connecting said antenna means to said radar receiver means,
  first means included in said wave guide blocking signals of a predetermined polarization from reception by said radar receiver means,
  second means disposed in said wave guide means between said antenna means and said first means for changing the polarization of a received ECM signal to said predetermined polarization blocked from reception by said radar receiver means.

12 Claims, 5 Drawing Figures

RADAR SYSTEM

The invention described herein may be manufactured and used by or for the Government of the United States of America for governmental purposes without the payment of any royalties thereon or therefor.

This invention relates to a radar system and more particularly to a radar system having the capability of operating effectively in an ECM (electronic countermeasure) environment.

With the advent of current and anticipated ECM equipments which are highly efficient in jamming present day radar systems it became essential that a radar system capable of operating in an ECM environment be developed.

To accomplish such an objective, equipments were developed which utilized techniques for achieving operation enhancement in an ECM environment functioning in the time and frequency domain. However, these types usually require an individual fix for each type of ECM. In other words one of these equipments provided a universal fix whereby the radar system was provided with complete immunity to all of the various types of ECM. Therefore, in order to achieve the desired immunity utilizing these techniques, individual ECM systems utilizing several different techniques had to be incorporated into one radar system which encumbered it with substantially more electronic hardware and increased complexity incident thereto.

The present invention utilizes a polarization technique which provides immunity for the radar system against all ECM signals. This desired immunity is obtained by causing the radar system to operate at a polarization that is orthogonal to the polarization of the ECM equipment while substantially preventing any ECM signal from entering the radar receiver.

The present invention contemplates the modification of a radar system to provide continuous automatic polarization selection whereby the radar automatically changes its polarization to be orthogonal with that of the ECM equipment. In order to accomplish this function it was required to provide the radar system (1) with the capability of transmitting and receiving selectively on any of the infinite variety of polarizations and (2) to provide the radar system with the capability of determining the polarization of the received ECM signal and to change the polarization of the radar system transmitted signal to be orthogonal thereto. The actual provision of a radar system with these two capabilities provides the radar system with what may be termed continuous automatic polarization selection. In order to enable the radar system to transmit and receive selectively on any of the infinite variety of polarizations, two dielectric phase shifters in a round wave guide of fixed lengths with one acting as a quarter wave plate and the other acting as a half wave plate are utilized. Actual polarization change is accomplished by proper rotation of the phast shifters with respect to the incident wave in the wave guide. The polarization of the incident wave is determined by resolving the ECM signal into two orthogonal components and measuring their relative amplitudes and phases. The information derived from these measurements is used as error voltages to drive individual servos which automatically rotate the two dielectric plates to positions that cause the radar to transmit at a polarization orthogonal to the ECM polarization through a channel which is free of the ECM signal.

Therefore, it is an object of the present invention to provide a radar system with the capability of operating in an ECM environment.

Another object of the present invention is to provide a radar system with immunity to all ECM signals by providing it with the capability of selecting and operating at a polarization that is orthogonal to the polarization of the ECM signal.

A further object of the present invention is to provide a conventional radar system with a continuous automatic polarization selection capability while at the same time maintaining hardware addition and radar system complexity at a minimum.

Yet another object of the present invention is to provide a radar system with means for maintaining tactical usefulness in an ECM environment by causing a radar system to transmit at a polarization orthogonal to ECM signal polarization and receive over a channel substantially free from any ECM signal.

Other objects and many of the attendant advantages inherent in the present invention will become apparent and more fully appreciated from the following detailed description of a preferred embodiment of the invention as illustrated in the accompanying drawings in which:

FIG. 1 illustrates in block diagram form a preferred embodiment of the invention, and FIG. 2 is a graphic illustration of the technique employed for generation of any polarization.

FIG. 1 illustrates a radar system modified to enable it to automatically operate on a polarization that is orthogonal to an ECM signal. The tracking radar system shown comprises an antenna 11 connected through a wave guide to duplexer 12. During the receive mode of operation duplexer 12 would be in such a switched condition as to connect the received signal to mixer 13. Automatic frequency control 14 which is energized by a signal from duplexer 12 when duplexer 12 is switched to the receive mode controls the frequency of oscillator 16 whose output is connected to mixer 13. Mixer 13 is connected to radar receiver 18 through preamplifier 17. Automatic gain control 19 receives the output from radar receiver 18 and provides controlling inputs to preamplifier 17 and radar receiver 18 in a manner well known in the art. Radar receiver 18 provides typical inputs to range track system 21, angle track system 22 and indicator 23. A magnetron 20 provides pulses to antenna 11 for transmission when duplexer 12 is in the transmit mode.

The antenna 11 of a conventional tracking radar system such as described above is normally a vertically polarized type. However, the present invention necessitates the use of an antenna capable of accepting any polarization. Such an antenna may be fabricated by substituting round wave guides for the rectangular wave guides throughout the gimbal system and providing new rotating joints with the structural and dimensional changes required while maintaining search and track capabilities of the original tracking radar system.

Block 24 represents a portion of the round wave guide between antenna 11 and duplexer 12 in which there are disposed a quarter wave plate assembly and half wave plate assembly schematically illustrated by disks 26 and 27, respectively, which are rotatable by motors 28 and 29, respectively, as hereinafter more fully explained. Half wave plate 27 has the capability of rotating a linear polarization through 360° without altering its linearity. Thus, the orientation of half wave plate 27 with respect to the incident wave determines the orientation of the linear wave. Quarter wave plate 26 functions to introduce an ellipticity to the linear wave. The orientation of quarter wave plate 26 with respect to an incident wave determines the resulting ellipticity. The techniques employed in the use of the half wave plate 27 and quarter wave plate 26 for generation of any polarization are more fully described hereinafter with reference to FIG. 2.

A polarization divider or orthogonal mode transducer 31 forms part of the wave guide connecting the wave guide represented by block 24 to duplexer 12 and TR box 32. Polarization divider 31 is required to resolve the incident energy received at antenna 11 into two linear orthogonal components and in practice comprises two rectangular wave guides with the necessary impedance matching.

Mixer 34 receives one input through wave guide 33 which is connected to TR box 32. Mier 34 which is identical to mixer 13 receives its second input from oscillator 16 after being phase shifted in phase shifter 36. The output of mixer 34 is connected to receiver 37 while the output from mixer 13 is connected to receiver 38 via preamplifier 17. Each of the receivers 37 and 38 has its own automatic gain control 39 and 41, respectively.

Range track system 21 provides a trigger to gate generator 42 depending on the range of a selected target. Gate generator 42 has its output terminal connected to receiver 37 and automatic gain control 39, and also receiver 38 and automatic gain control 41 and provides each with a gate pulse, that is, turns them on during the relatively short period during which receipt of a radar pulse is expected.

The output of receiver 37 is connected to quadrature detector 43, in-phase detector 44, and 90° phase shifter 46. The output terminal of receiver 38 is connected to phase shifter 46 and in-phase detector 44 with phase shifter 46 being coupled to quadrature detector 43. The output of in-phase detector 44 drives motor 29 after being amplified in servo amplifier 47. Similarly, the output from quadrature detector 43 drives motor 28 after being amplified in servo amplifier 48.

OPERATION

On receipt of an ECM signal by antenna 11 the signal passes through the wave guide containing quarter wave plate 26 and half wave plate 27 to polarization divider 31 where it is resolved into two linear fields at right angles to each other. After this resolution, one component is fed to mixer 34 through TR box 32 while the other linear component is fed to mixer 13 through duplexer 12. The polarization of the received ECM signal is determined by measuring the relative phase and amplitudes of the two components of the signal. By use of the common local oscillator 16 with the mixers 34 and 13 the phase and amplitude information of the component is preserved in the signals at the output of the mixers 34 and 13. Phase shifter 36 is inserted between mixer 34 and oscillator 16 to compensate for unequal line lengths between the polarization divider 31 and the mixers 34 and 13.

The outputs from mixers 34 and 13 are normally amplified and fed to receivers 37 and 38, respectively. The automatic gain controls 39 and 41 are employed to adjust the gains in receivers 37 and 38 in accordance with the strength of the sampled ECM signal. The gating signal from gate generator 42 is employed for sampling the ECM signal by turning on receivers 37 and 38 during and immediately following the target signal being tracked by the radar. Thus, the levels of automatic gain controls 39 and 41 are set in accordance with the level of the jamming signal at each receiver. Providing each receiver 37 and 38 with an independent automatic gain control system provides a constant output from receivers 37 and 38 until operation under ECM conditions. During ECM conditions when one receiver approaches a minimum signal condition the other receiver will be receiving a strong signal. The system is designed such that the channel that is leading into radar receiver 18 is receiving the minimum jamming signal at a maximum gain and will be the channel used by the radar for receiving radar signals. The channel receiving the strong jamming signal will be at a reduced gain and the signal in this channel will be the full jamming signal. Thus, the radar signal is prevented from influencing the polarization measurement of the jamming energy.

The outputs from receivers 37 and 38 are fed to in-phase detector 44 which determines the amplitude ratio and sense of the in-phase components. The outputs from receivers 37 and 38 are fed to quadrature detector 43 which determines the relative phase of the two signals. Since the quadrature detector error signal is null when a 90° phase relationship exists between the two signals, a fixed 90° phase shifter 46 is used in one signal path, that is, between receiver 38 and quadrature detector 43. The outputs from inphase detector 44 and quadrature detector 43 are the error signals used to drive motors 29 and 28, respectively, which in turn cause the half wave plate and the quarter wave plate to rotate to a position that changes the polarization of the received ECM signal so that only one port of polarization divider 31 is excited. This leaves the other port free from the interfering signal and available for radar use. Thus, the jamming signal is eliminated from the radar receiver 18. The orientation of the wave plates 27 and 26 in accordance with the relative phase and amplitude of the orthogonal components of the received ECM signal automatically causes the transmitted signal from the radar signal to have a polarization which is orthogonal to the polarization of the received ECM signal and thus free from interference thereby. Since the present system is a closed loop system, the output of detectors 44 and 43 go to zero when the polarization of the received ECM signal at the polarization divider 31 is linear and rotated to a position that excites only the arm or channel not used by the radar. The wave plates are used to change the polarization of the received ECM signal to a linear polarization and an orientation that will excite the port in the polarization divider 31 not being used by the radar receiver 18 and thus provide the radar with the desired immunity. The transmitted and received radar signal by virtue of this invention will always be orthogonal to the polarization of the ECM signal and will be the only signal introduced into the radar receiver 18.

The technique employed for generating any polarization including the special cases of circular and random oriented linear polarizations is presented as an aid to understanding principles of the present invention more completely.

The present invention utilizes the half wave and quarter wave plates 27 and 26 to present an anistropic dielectric effect medium to an incident wave. That is, one component of the wave will be a medium of different propagation constant than will the orthogonal component. Due to the fact that a wave propagates with a slower phase velocity in a medium of greater effective dielectric constant, the component traveling in such a medium will be delayed with respect to the other component. In a circular wave guide the magnitude of the relative delay of one component with respect to the other will be a function of the length of the plate. A plate may be designed to produce any desired phase shift of one component with respect to the orthogonal component. A plate causing a half wave relative delay followed by one that will produce a quarter wave delay is sufficient to accomplish the object of producing any polarization from an incident linear polarization. That this is true will become apparent from the following discussion.

Figure 2A:
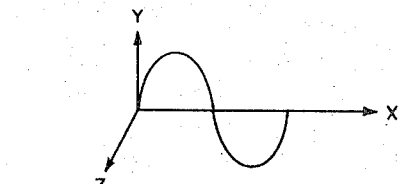
Figure 2B:
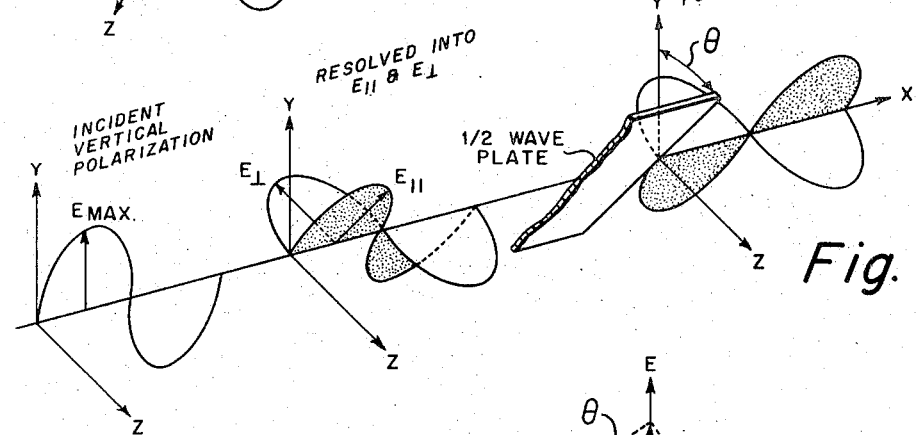

FIG. 2a illustrates a wave of initial incident polarization that is linear, vertical and of the form $$E = E_{max} \sin(wt - \beta x) \quad (1)$$

where
$w = 2\pi f$
$\beta$ = phase constant $(2\pi/\lambda)$
$x$ = distance measured in the direction of propagation This wave may be resolved pictorially into two in-phase linearly polarized components; one parallel component $E_{11}$ and one perpendicular component $E_\perp$ with respect to the first dielectric plate. By making the valid assumption that the first plate is the half wave plate as illustrated in FIG. 2b a polarization incident upon the half wave plate is given by $$E_\perp = E_{max} \sin\theta \sin(wt - \beta x) \quad (2)$$

$$E_{11} = E_{max} \cos\theta \sin(wt - \beta x)$$

let:
$$E_{max} \sin\theta = e_1 \quad (3)$$

$E_{max} \cos\theta = e_2$
$wt - \beta x = \psi$
then:
$$E_\perp = e_1 \sin\psi \quad (4)$$

$E_{11} = e_2 \sin\psi$
Transmitted polarization from half wave plate:
$$E_\perp = e_1 \sin\psi \quad (5)$$

Figure 2C:
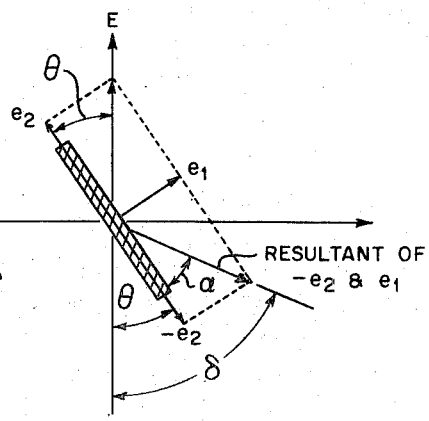
Figure 2D:
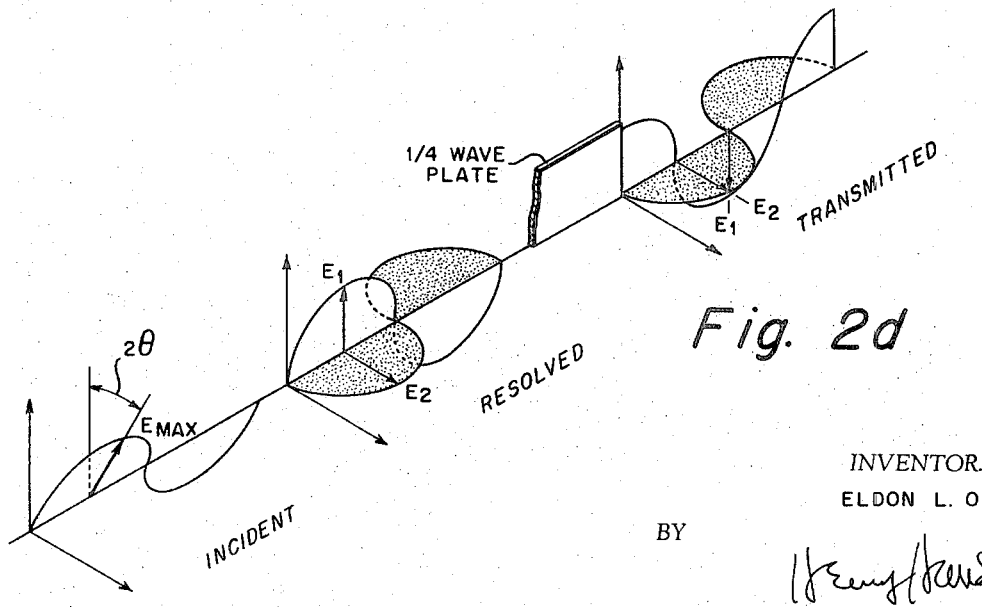

$E_{11} = e_2 \sin(\psi - \pi)$
$E_\perp = e_1 \sin\psi \quad (6)$ $E_{11} = e_2 \sin\psi$
The polarization transmitted from the half wave plate is linear dependent upon $\theta$ as shown in FIG. 2c for its orientation. In the relationship shown in FIG. 2c
$\delta = \theta + \alpha = \theta + \tan^{-1}(e_2/e_1) = \theta + \theta = 2\theta$
$\delta = 2\theta$
Thus, the orientation of the polarization transmitted from the half wave plate is numerically equal to $2\theta$. Therefore, the polarization incident upon the succeeding quarter wave plate as best shown in FIG. 2d will be linear and of a variable orientation. Regardless of the orientation of the linearly polarized wave incident upon the quarter wave plate, it can be resolved into two linearly polarized in-phase components where one is parallel and the other is perpendicular to the quarter wave plate. This relationship is shown in FIG. 2d and may be mathematically represented by the following:
$E_1 = E_{max} \cos 2\theta$
$E_2 = E_{max} \sin 2\theta$
$$E_{11} = E_1 \sin(\psi - \pi/2) \quad (7)$$

$E = E_2 \sin\psi$
$$E_{11} = E_1 \cos\psi \quad (8)$$

$E_\perp = E_2 \sin\psi$

As may be seen from Equations 8 the polarization transmitted from the quarter wave plate is elliptical since Equations 8 are the parametric equations of an ellipse. The actual ratio ($E_1/E_2$) is determined jointly by $\theta$ of the first plate and by the relative angle between the two plates. The orientation of the ellipse is determined by the position of the quarter wave plate with the major and minor axes of the ellipse falling on the parallel and perpendicular axes of the quarter wave plate, respectively.

It should be noted that the foregoing detailed theoretical description relates to the radar signal as it is transmitted by antenna 11 after having passed through half wave plate 27 and quarter wave plate 26. It should be further noted that the orientation of the quarter wave plate 26 and half wave plate 27 as positioned by servo motors 28 and 29 is dependent on the polarization of the incident ECM signal which provides the information from which the error voltages which drive the servos 28 and 29 is derived. In response to these error voltages the servos automatically rotate the two dielectric plates 26 and 27 to positions that generate the desired polarization for the radar and divert the ECM signal to the channel not used by the radar receiver.

Obviously many modifications and variations of the present invention are possible in the light of the above teachings. It is, therefore, to be understood that within the scope of the appended claims the invention may be practiced otherwise than as specifically described.

What is claimed is:

1. A radar system capable of effective operation in an ECM environment, comprising in combination:
   antenna means,
   radar receiver means,
   wave guide means connecting said antenna means to said radar receiver means,
   first means included in said wave guide blocking signals of a predetermined polarization from reception by said radar receiver means,
   second means disposed in said wave guide means between said antenna means and said first means for changing the polarization of a received ECM signal to said predetermined polarization blocked from reception by said radar receiver means.

2. A radar system capable of effective operation in an ECM environment, comprising in combination:
   antenna means,
   radar receiver means,
   polarization divider means having a first arm connected to said radar receiver means and a second arm and resolving an incident ECM signal into two linear orthogonal components, wave plate means connected between said antenna means and said polarization divider means, control means connected to said first and second arms of said polarization divider means and said wave plate means for adjusting the position of said wave plate means in response to said two linear orthogonal components to change the polarization of the incident ECM signal whereby the ECM signal is eliminated from said first arm of said polarization divider means.

3. A radar system capable of operation in an ECM environment, comprising in combination:

radar receiver means, antenna means, polarization divider means having a first arm connected to said radar receiver means and a second arm and resolving an incident ECM signal into two linear orthogonal components, wave plate means connected between said antenna means and said polarization divider means, duplexer means disposed in said first arm between said radar receiver means and said polarization divider means, radar transmitter means connected to said duplexer means providing radar pulses, control means connected to said first and second arms of said polarization divider means and said wave plate means for adjusting the position of said wave plate means in response to said two linear orthogonal components to change the polarization of any signal passing therethrough whereby the ECM signal is eliminated from said first arm of said polarization divider means and the radar pulses are transmitted at a polarization orthogonal to the incident ECM signal.

4. In a radar system for use in an ECM environment:

antenna means, polarization divider means comprising first and second arm means resolving an ECM signal incident to said antenna means into first and second linear orthogonal components, wave guide means connected between said antenna means and said polarization divider means, wave plate means disposed in said wave guide means between said antenna means and said polarization divider means, first circuit means connected to said polarization divider means providing a voltage proportional to the amplitude and sense of the in-phase components of said first and second linear orthogonal components, second circuit means connected to said polarization divider means providing a voltage proportional to the phase difference between said first and second linear orthogonal components, servo motor means connected to said first and second circuit means and said wave plate means for adjusting said wave plate means to change the polarization of the ECM signal whereby the ECM signal is eliminated from one of said first and second arms.

5. A radar system capable of effective operation in an ECM environment, comprising in combination:

antenna means, polarization divider means comprising first and second arm means resolving an ECM signal incident to said antenna means into first and second linear orthogonal components, radar receiver means connected to said antenna means through said first arm of said polarization divider means, wave guide means connected between said antenna means and said polarization divider means, wave plate means disposed in said waveguide means between said antenna means and said polarization divider means, first circuit means connected to said polarization divider means providing a voltage proportional to the amplitude and sense of the in-phase components of said first and second linear orthogonal component, second circuit means connected to said polarization divider means providing a voltage proportional to the phase difference between said first and second linear orthogonal component, servo motor means connected to said first and second circuit means and said wave plate means for adjusting said wave plate means to change the polarization of the ECM signal whereby the ECM signal is eliminated from said first arm of said polarization divider means and thus prevented from being received by said radar receiver means.

6. A radar system capable of effective operation in ECM environment, comprising in combination:

antenna means, polarization divider means comprising first and second channel means resolving an ECM signal incident to said antenna means into first and second linear orthogonal components, wave guide means connected between said antenna means and said polarization divider means, radar receiver means connected to said antenna means through said first channel means, duplexer means disposed within said first channel means between said polarization divider means and said radar receiver means, radar transmitter means connected to said duplexer means for transmitting radar pulses, wave plate means disposed in said wave guide means between said antenna means and said polarization divider means, first circuit means connected to said polarization divider means providing a voltage proportional to the amplitude and sense of the in-phase components of said first and second linear orthogonal components, second circuit means connected to said polarization divider means providing a voltage proportional to the phase difference between said first and second linear orthogonal components, servo motor means connected to said first and second circuit means and said wave plate means for adjusting said wave plate means to change the polarization of the ECM signal and any radar pulse transmitted therethrough whereby the ECM signal is eliminated from said first channel means and any transmitted radar pulse is oriented to have a polarization orthogonal to the polarization of the incident ECM signal.

7. In a radar system for use in an ECM environment:

antenna means,
polarization divider means comprising first and second channel means resolving an ECM signal incident to said antenna means into first and second linear orthogonal components,
wave guide means coupling said antenna means to said polarization divider means,
said wave guide means including rotatable quarter wave plate means and rotatable half wave plate means,
first circuit means connected to said first channel means providing an output representative of the phase and amplitude of said first linear orthogonal component,
second circuit means connected to said second channel means providing an output representative of the phase and amplitude of said second linear orthogonal components,
first detector means connected to said first and second circuit means providing an output proportional to the amplitude and sense of the in-phase components of said first and second linear orthogonal component,
second detector means connected to said first and second circuit means providing an output proportional to the phase difference between said first and second linear orthogonal components,
servo motor means connected between said half wave plate means and said first detector means rotating said half wave plate means an amount proportional to the output of said first detector means,
second servo means connected between said quarter wave plate means and said second detector means rotating said quarter wave plate means an amount proportional to the output of said second detector means,
whereby the polarization of the ECM signal incident to said antenna means is changed such that the ECM signal is eliminated from said first channel of said polarization divider means.

8. A radar system according to claim 7 wherein said first and second circuit means each comprise:
oscillator circuit means,
mixer circuit means connected to its associated first or second channel means and said oscillator circuit means providing an output voltage representative of the amplitude and phase of its associated input, ECM signal receiver means including automatic gain control means connected to said mixer circuit means and its associated first or second detector circuit means.

9. A radar system capable of effective operation in an ECM environment, comprising:
antenna means,
polarization divider means comprising first and second channel means resolving an ECM signal incident to said antenna means into first and second linear orthogonal components,
wave guide means coupling said antenna means to said polarization divider means,
said wave guide means including rotatable quarter wave plate means and rotatable half wave plate means,
radar receiver means connected to said antenna means through said fixed channel means, first circuit means connected to said first channel means providing an output voltage representative of the phase and amplitude of said first linear orthogonal component,
second circuit means connected to said second channel means providing an output voltage representative of the phase and amplitude of said second linear orthogonal components,
first detector means connected to said first and second circuit means providing an output proportional to the amplitude and sense of the in-phase components of said first and second linear orthogonal component,
second detector means connected to said first and second circuit means providing an output proportional to the phase difference between said first and second linear orthogonal components,
servo motor means connected between said half wave plate means and said first detector means rotating said half wave plate means an amount proportional to the output of said first detector means, second servo means connected between said quarter wave plate means and said second detector means rotating said quarter wave plate means an amount proportional to the output of said second detector means,
whereby the polarization of the ECM signal incident to said antenna means is changed preventing the ECM signal from being received by said radar receiver means.

10. A radar system according to claim 9 wherein said first and second circuit means each comprise:
oscillator circuit means,
mixer circuit means connected to its associated first or second channel means and said oscillator circuit means providing an output voltage representative of the amplitude and phase of its associated input, ECM signal receiver means including automatic gain control means connected to said mixer circuit means and its associated first or second detector circuit means.

11. A radar system capable of effective operation in an ECM environment, comprising:
antenna means,
polarization divider means comprising first and second channel means resolving an ECM signal incident to said antenna means into first and second linear orthogonal components,
wave guide means coupling said antenna means to said polarization divider means,
said wave guide means including rotatable quarter wave plate means and rotatable half wave plate means,
radar receiver means connected to said antenna means through said fixed channel means,
duplexer means disposed within said first channel means between said polarization divider means and said radar receiver means,
radar transmitter means connected to said duplexer means for transmitting radar pulses,
first circuit means connected to said first channel means providing an output voltage representative of the phase and amplitude of said first linear orthogonal component, second circuit means connected to said second channel means providing an output voltage representative of the phase and amplitude of said second linear orthogonal components, first detector means connected to said first and second circuit means providing an output proportional to the amplitude and sense of the in-phase components of said first and second linear orthogonal component, second detector means connected to said first and second circuit means providing an output proportional to the phase difference between said first and second linear orthogonal components, servo motor means connected between said half wave plate means and said first detector means rotating said half wave plate means an amount proportional to the output of said first detector means, second servo means connected between said quarter wave plate means and said second detector means rotating said quarter wave plate means an amount proportional to the output of said second detector means, whereby the ECM signal is eliminated from said first channel means and any transmitted radar pulse is oriented to have a polarization orthogonal to the polarization of the incident ECM signal.

12. A radar system according to claim 11 wherein said first and second circuit means each comprise:

oscillator circuit means, mixer circuit means connected to its associated first or second channel means and said oscillator circuit means providing an output voltage representative of the amplitude and phase of its associated input, ECM signal receiver means including automatic gain control means connected to said mixer circuit means and its associated first or second detector circuit means.

* * * * *